US012673629B2

(12) United States Patent
Felleisen

(10) Patent No.: US 12,673,629 B2
(45) Date of Patent: Jul. 7, 2026

(54) SAFETY DEVICE AND METHOD FOR AVOIDANCE OF DOORING INJURIES

(71) Applicant: Intel Corporation, Santa Clara, CA (US)

(72) Inventor: Juergen D. Felleisen, Baden-Baden (DE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/948,261

(22) Filed: Sep. 20, 2022

(65) Prior Publication Data

US 2023/0007914 A1    Jan. 12, 2023

(51) Int. Cl.
 *B60R 21/01*   (2006.01)
 *B60R 21/0134*  (2006.01)
 *B60R 21/015*   (2006.01)
(52) U.S. Cl.
 CPC ........ *B60R 21/015* (2013.01); *B60R 21/0134* (2013.01)
(58) Field of Classification Search
 CPC .......................... B60R 21/015; B60R 21/0134
 See application file for complete search history.

(56) References Cited

U.S. PATENT DOCUMENTS

| | | | | | |
|---|---|---|---|---|---|
| 11,214,249 | B2 * | 1/2022 | Mielenz | ............ | B60W 30/0956 |
| 2004/0239509 | A1 * | 12/2004 | Kisacanin | .............. | G08B 21/06 |
| | | | | | 340/575 |
| 2010/0185341 | A1 * | 7/2010 | Wilson | ................ | B60R 25/2045 |
| | | | | | 701/1 |
| 2017/0371347 | A1 * | 12/2017 | Cohen | ...................... | G06T 7/277 |
| 2018/0238098 | A1 * | 8/2018 | Rhode | ................. | B60R 21/0134 |
| 2018/0370431 | A1 * | 12/2018 | Wincek | .................. | B60Q 1/544 |
| 2019/0078359 | A1 * | 3/2019 | Zhang | .................... | B60Q 9/008 |
| 2019/0143936 | A1 * | 5/2019 | Abel Rayan | ........... | B60R 25/10 |
| | | | | | 701/2 |
| 2020/0040635 | A1 * | 2/2020 | Lin | .......................... | B60J 5/047 |
| 2020/0079371 | A1 * | 3/2020 | Sakamoto | .............. | G06V 40/20 |
| 2020/0103980 | A1 * | 4/2020 | Katz | ........................ | G06F 3/167 |
| 2020/0139965 | A1 * | 5/2020 | Hanna | ............... | B60W 30/0956 |
| 2020/0202209 | A1 * | 6/2020 | Mao | .......................... | G06N 3/08 |
| 2020/0207358 | A1 * | 7/2020 | Katz | ................... | G01C 21/3697 |
| 2020/0290607 | A1 * | 9/2020 | Mielenz | ................ | B60W 30/09 |
| 2020/0298874 | A1 * | 9/2020 | Noguchi | ............ | B62D 15/0285 |
| 2020/0361415 | A1 * | 11/2020 | Godet | .................... | H03K 17/96 |
| 2023/0061499 | A1 * | 3/2023 | Salter | .................... | B60R 25/305 |

OTHER PUBLICATIONS

"Dutch Reach Project—A site to promote the Dutch far-hand habit to avoid dooring cyclists, or drivers or passengers from stepping into on-coming traffic", https://www.dutchreach.org, 28 pages, downloaded on Sep. 14, 2022.

* cited by examiner

*Primary Examiner* — Joseph J Dallo
(74) *Attorney, Agent, or Firm* — Viering, Jentschura & Partner mbB

(57)          ABSTRACT

A safety device includes a processor configured to detect from sensor data representing a vehicle occupant, whether the vehicle occupant looks for an oncoming road participant or obstacle; operate according to a first operational mode when the processor detects that the vehicle occupant looks for an oncoming road participant or obstacle; and operate according to a second operational mode when the processor detects that the vehicle occupant does not look for an oncoming road participant or obstacle.

17 Claims, 5 Drawing Sheets detecting from sensor data representing a vehicle occupant, whether the vehicle occupant looks for an oncoming cyclist 402 operating according to a first operational mode when the processor detects that the vehicle occupant looks for an oncoming cyclist 404 according to a second operational mode when the processor detects that the vehicle occupant does not look for an oncoming cyclist 406

FIG. 4

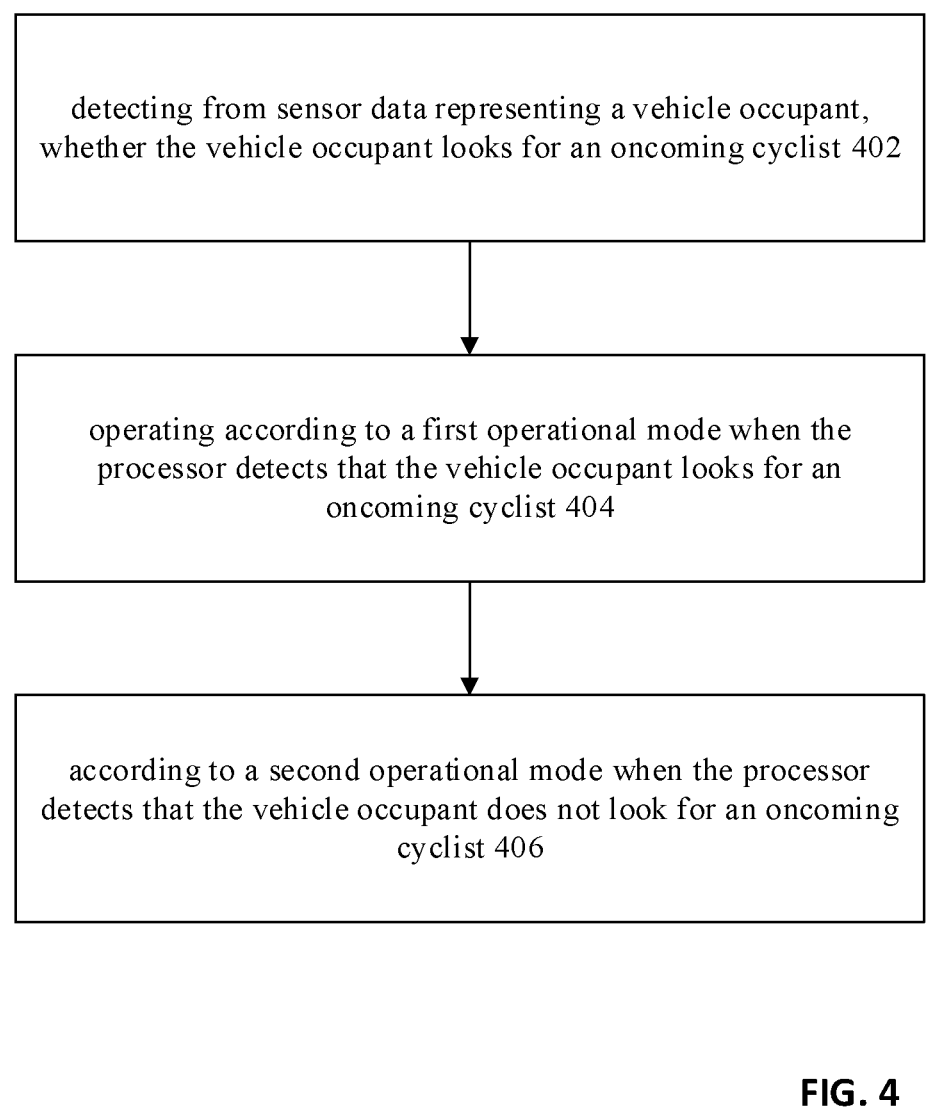

SAFETY DEVICE AND METHOD FOR AVOIDANCE OF DOORING INJURIES

TECHNICAL FIELD

Various aspects of this disclosure generally relate to computer recognition of human behavior to determine whether a vehicle occupant performs various actions to discover and/or protect a cyclist.

BACKGROUND

Dooring accidents are caused by opening a motor vehicle's door into a path of another road user (e.g. a cyclist). Very often, bicycle lanes are placed such that cyclists must ride in close proximity to parked or stopped vehicles, such as a bicycle lane that runs next to a series of parallel-parked vehicles. An unsuspecting or inattentive vehicle occupant may open the occupant's vehicle door into the bicycle lane in which a cyclist is approaching. Depending on the distance between the cyclist and the door, it may be impossible for the cyclist to stop or otherwise avoid collision with the opened door.

BRIEF DESCRIPTION OF THE DRAWINGS

In the drawings, like reference characters generally refer to the same parts throughout the different views. The drawings are not necessarily to scale, emphasis instead generally being placed upon illustrating the exemplary principles of the disclosure. In the following description, various exemplary embodiments of the disclosure are described with reference to the following drawings, in which:

FIG. 4 depicts a method of determining whether a vehicle occupant performs various actions to discover and/or protect a cyclist.

DESCRIPTION

Figure 1:
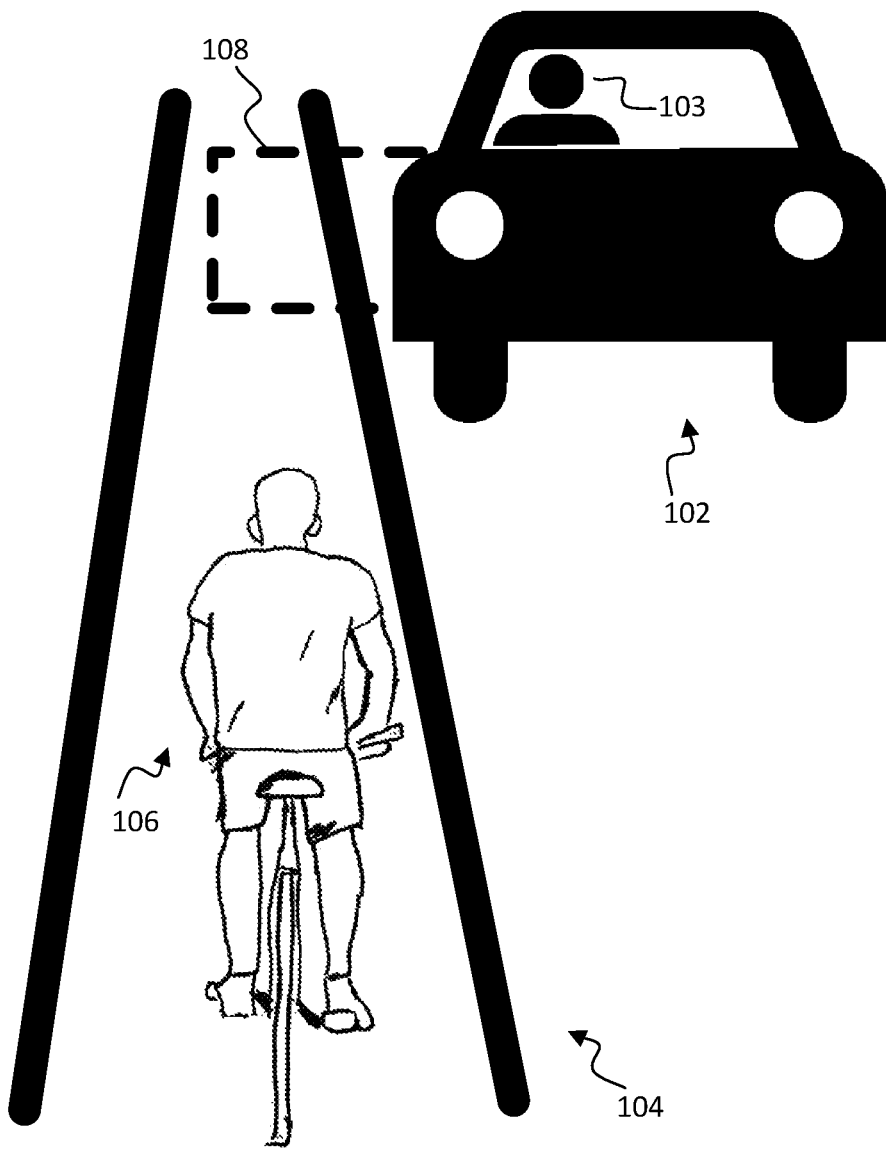
FIG. 1 depicts a vehicle with a vehicle occupant, which is parked adjacent to a bicycle lane.

The following detailed description refers to the accompanying drawings that show, by way of illustration, exemplary details and embodiments in which aspects of the present disclosure may be practiced.

The word "exemplary" is used herein to mean "serving as an example, instance, or illustration". Any embodiment or design described herein as "exemplary" is not necessarily to be construed as preferred or advantageous over other embodiments or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc.).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory. The term "software" refers to any type of executable instruction, including firmware.

The term "image sensor" as used herein refers to one or more sensors that are configured to detect electromagnetic radiation and to generate data representing the detected electromagnetic radiation. Such detected electromagnetic radiation may be electromagnetic radiation within the visible spectrum, such as, for example, with a camera, within the invisible electromagnetic radiation spectrum, such as, for example, with RADAR, or a combination of the visible and invisible spectra.

It is known to use a maneuver called the "Dutch Reach" to reduce the likelihood of a dooring injury. In the Dutch Reach, the vehicle occupant uses the occupant's far hand (e.g. the hand opposite the door, as opposed to the hand adjacent to the door) to open the car door. This usually requires the occupant to turn the occupant's body toward the window, which greatly increases the likelihood that the vehicle occupant will see an oncoming road participant or obstacle (e.g. such as in the side mirror, or even via directly, such as through the window). The body position of the Dutch Reach has the additional advantage of placing the occupant's head in a convenient position to view an oncoming road participant or obstacle. For example, once turned in the Dutch Reach position, the occupant can see cyclists approaching the vehicle from the front simply by directing the occupant's eyes to the front of the vehicle through the side window. Similarly, once turned in the Dutch Reach position, the occupant can see cyclists approaching the vehicle from the rear simply by directing the occupant's eyes to the side mirror through the side window. Alternatively or additionally, the occupant can turn the occupant's head toward the rear of the view and directly visualize cyclists approaching from the rear (e.g. as opposed to viewing them in a mirror).

Because of the added safety for cyclists and the simplicity of the maneuver, many jurisdictions encourage or even mandate the use of the Dutch Reach. Nevertheless, even where required, universal performance of the Dutch Reach remains merely aspirational, as occupants may forget or elect not to perform a Dutch Reach in a particular situation. These exceptions represent an unnecessary risk of injury to cyclists. In this disclosure, various technical solutions are presented to detect performance of the Dutch Reach or a maneuver similar to the Dutch Reach, and to alert occupants of an increased risk of danger when the maneuver is not performed.

Many vehicles include various forms of Advanced-Driver Assistance Systems (ADAS), which include various technological implementations that assist drivers in various functions such as driving and/or parking. Although these come in myriad forms, ADAS systems generally include one or more sensors, which detect information about the interior and/or the exterior of the vehicle and generate corresponding data, and one or more processors, which interpret these data to assist in various safety-related tasks. Alternatively or additionally, vehicles may be equipped with other systems that utilize in-cabin sensors. For examples, vehicles may be equipped with one or more autonomous driving functions, one or more self-driving functions and/or one or more semi-autonomous driving functions. Alternatively or additionally, vehicles may be equipped with in-cabin sensors for non-driving functions or may even be equipped with in-cabin sensors for unspecified for unrelated purposes. The safety device as disclosed herein may utilize in-cabin sensor information from any of these sources, or from any in-cabin image sensors whatsoever. These one or more in-cabin sensors may include, for instance, one or more cameras (e.g. image sensors, video cameras, depth cameras, etc.), light detection and ranging (LIDAR) devices, radio detection and ranging (RADAR) devices, ultrasound generators/detectors, microphones, pressure sensors. These sensors may be configured to obtain information about an area external to the vehicle, an area internal to the vehicle, or both.

If a processor detects from in-cabin sensor data a vulnerable traffic participant (e.g. an oncoming road participant or obstacle, a bicyclist, a cyclist on a powered bicycle, or a motorcyclist), passing or predicted to pass at close distance, and there could be a danger of dooring, this may be combined with in-cabin driver/passenger monitoring to provide an alert to the driver/passenger and/or activate an automatic control function, such as temporarily locking a door or providing an external signal to the vulnerable traffic participant. This functionality could be dependent on the speed and or direction of the vulnerable traffic participant, and described functionality could be executed above a certain speed and/or direction threshold. This functionality could consider the space or boundaries defined from a door fully closed and fully opened. This functionality could consider the overall traffic situation in the vicinity, e.g. in a crowded street manoeuvers might be restricted, or a vulnerable traffic participant might need to change trajectory suddenly to avoid other traffic participants. This functionality could depend on a defined risk setting. In addition, this functionality might also apply to pedestrians, including those using wheelchairs, powerboards, or autonomous or remotely controlled vehicles.

Of particular interest for this disclosure are sensors directed to an interior of the vehicle. As described above, many vehicles already include sensors to detect information from the interior of a vehicle, such as, for example, cameras directed toward vehicle occupants. Many of these vehicles include one or more processors that are configured to process sensor data corresponding to images of one or more vehicle occupants and then to take actions based on decisions made from these data. For example, the one or more processors may determine that a driver is falling asleep or paying insufficient attention to the task of driving. In such instances, the one or more processors may implement an alert to warn the driver. Although the above example is described with respect to image sensor data, it is expressly stated that the principles and method disclosed herein may be performed with other data sources. A non-exclusive list of sensor data for the principles and methods disclosed herein include any of image sensor data (e.g. camera data), radar data, and LIDAR data.

In some aspects of the disclosure, the principles and methods disclosed herein may be performed using one or more in-cabin sensors and/or one or more corresponding processors, which may be optionally configured to perform one or more safety functions in addition to the Dutch Reach-related steps described herein. In many instances, it may be preferable to utilize in-vehicle sensors (or other sensors directed toward persons or objects within the vehicle) to evaluate the performance or a maneuver corresponding with the Dutch Reach, rather than using external sensors to directly check for the presence of oncoming road participants or obstacles. This may be at least because the geometry of image sensors mounted on a side of the vehicle often have a limited ability to perceive objects (e.g. such as bicycles) approaching along the side of the vehicle. This may occur, for example, because such image sensors are usually mounted close to the vehicle's body, such that the vehicle itself significantly limits the image sensor's field of vision. This problem is further complicated by vehicles that are parked laterally offset from the subject vehicle. Thus, the use of exterior mounted image sensors to warn of an approaching cyclist will often fail, at least because their field of vision is limited. By capitalizing on existing sensor data processing units (which may be used with existing cameras and/or with one or more additional cameras) vehicle occupants may be alerted to potentially dangerous situations.

The principles and methods disclosed herein may make use of a vehicle's in cabin cameras to monitor the occupant's (e.g. a driver, one or more passengers) behavior. In some configurations, some or all of the cameras already used in the vehicle (e.g. such as for driver drowsiness detection) may be re-used. The safety device may utilize one or more computer vision (CV) and/or artificial intelligence (AI) applications to detect occupant behavior and whether an occupant is facing the door with the occupant's upper body, and whether the occupant has looked out of the side window both forward and backward. The safety device may warn the occupant when the occupant fails to perform a Dutch Reach maneuver, such as via an audible signal, an optical signal such as by using door interior illumination, a haptic signal, by delaying the door opening, or any of these.

One or more image sensors may be placed inside the vehicle's cabin to monitor the behavior of the vehicle occupant(s). As stated above, these one or more image sensors may be image sensors that serve a dual purpose, such as performing another safety or driving function. Alternatively, these one or more image sensors may be expressly for the purpose of determining whether a Dutch Reach is performed as described herein.

The safety device may utilize one or more computer vision (CV) and/or artificial intelligence (AI) procedures, modules, or applications to evaluate the camera data and detect behavior of one or more vehicle occupants. In so doing, the safety device may determine whether a vehicle occupant has turned the vehicle occupant's upper body in the direction of the door window. If the vehicle occupant's body has been turned to the door window, the safety device may further determine whether the vehicle occupant has turned the occupant's head both forward and backward (e.g. so as to see a cyclist approaching from either the front or the rear of the vehicle). If each of these (e.g. turning upper body and turning head in both directions) has been performed, the safety device may operate according to a first operational mode. If the door release is operated before each of these is performed, the safety system may operate according to a second operational mode. The first operational mode may permit the door release to be operated unencumbered and without additional warnings as will be otherwise described. The second operational mode may result in the safety device triggering one or more warnings and/or delaying operation of the door release.

FIG. 1 depicts a vehicle 102 with a vehicle occupant 103, which is parked adjacent to a bicycle lane 104, in which a cyclist 106 is traveling. Should the vehicle occupant open the occupant's door, the door will open into a zone of danger 108 for the cyclist. Depending on factors such as the cyclist's speed, the distance between the cyclist and the door at the time the door is opened, and the cyclist's reaction time, it may be impossible for the cyclist to come to a stop before reaching the door, which may result in any of injuries to the cyclist, damage to the bicycle, or damage to the vehicle. Furthermore, depending on traffic and/or road conditions to the left of the bicycle lane, it may be impossible for the cyclist to evade collision with the door by traveling to the left of the bicycle lane.

Such injuries and/or property damage are largely avoidable if the vehicle occupant checks for oncoming road participants or obstacles before opening the door. Even well-intentioned vehicle occupants, however, may occasionally be distracted or forget to check for cyclists before opening the door. The safety device as described herein may use in-cabin sensor data to ensure that the occupant performed a safety procedure to check for oncoming road participants or obstacles (e.g. to perform various actions to detect an oncoming road participant or obstacle).

Figure 2A:
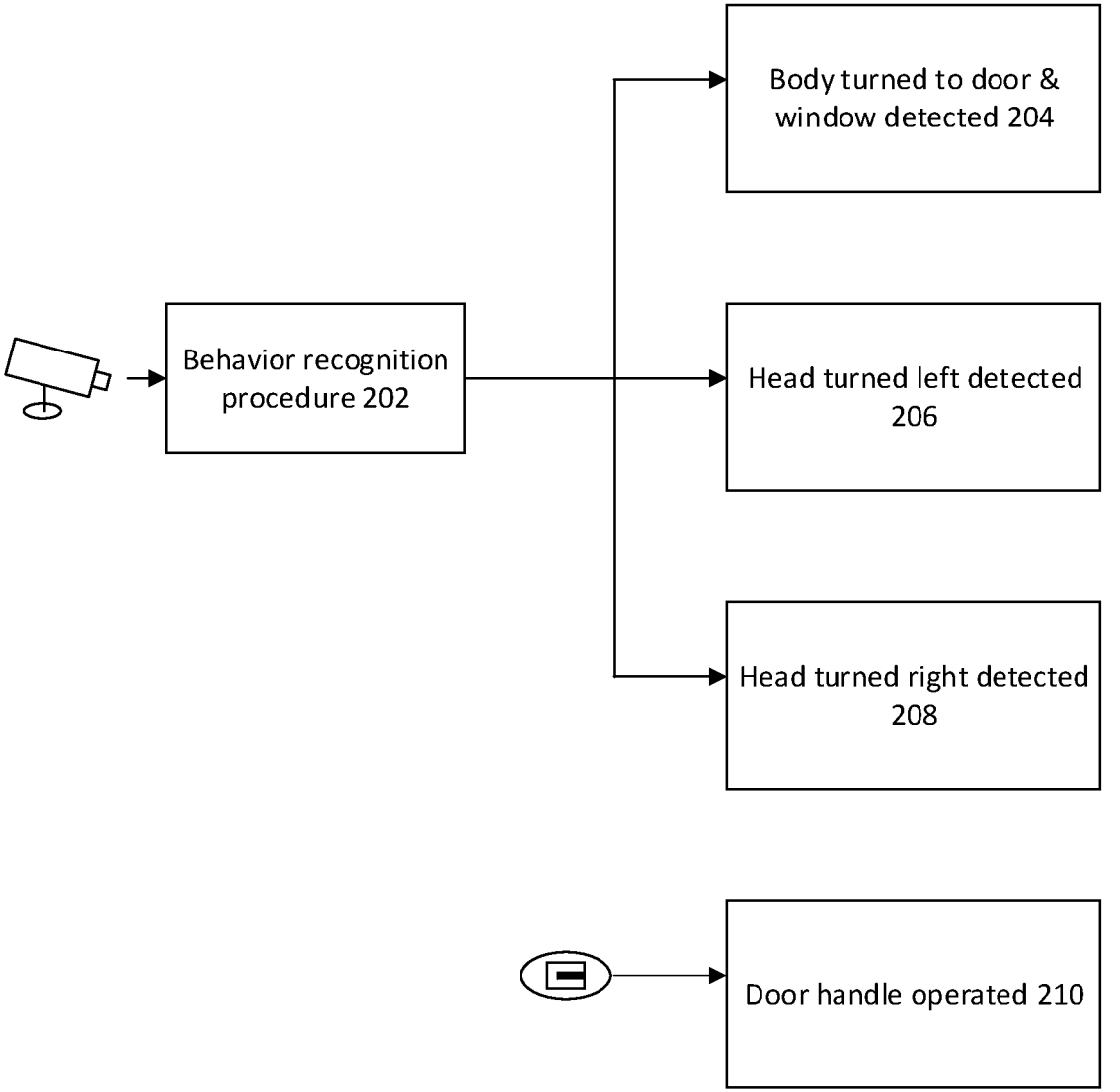
FIG. 2A depicts elements of a warning functionality.

FIG. 2A depicts elements of a warning functionality (e.g. the second operational mode) of the safety device. As depicted in this figure, the safety device receives sensor data and implements a behavior recognition procedure 202. During this procedure, the sensor data are analyzed to detect various actions of one or more vehicle occupants as stated in the following steps. The behavior recognition procedure 202 detects from the sensor data whether the vehicle occupant's body is turned toward the door and window 204. As described above with respect to the Dutch Reach maneuver, a vehicle occupant preparing to exit the vehicle will select a door of the vehicle for exit. The safety device will determine from the sensor data whether the vehicle occupant has turned the occupant's body toward the selected door 204. In addition, the safety device will determine from the sensor data whether the vehicle occupant has turned the occupant's head left 206 (e.g. corresponding to the rear of the vehicle on the driver's side and the front of the vehicle on the passenger's side). The safety device will also determine whether the vehicle occupant has turned the occupant's head to the right 208 (corresponding to the front of the vehicle on the driver's side and the rear of the vehicle on the passenger's side). When the door handle is operated 210, the safety device determines whether each of the steps at 204, 206, and 208 have been completed. If each of the steps have been completed, the safety device operates according to a first operational mode. If any one of these steps has not been completed, then the safety device operates according to a second operational mode.

Figure 2B:
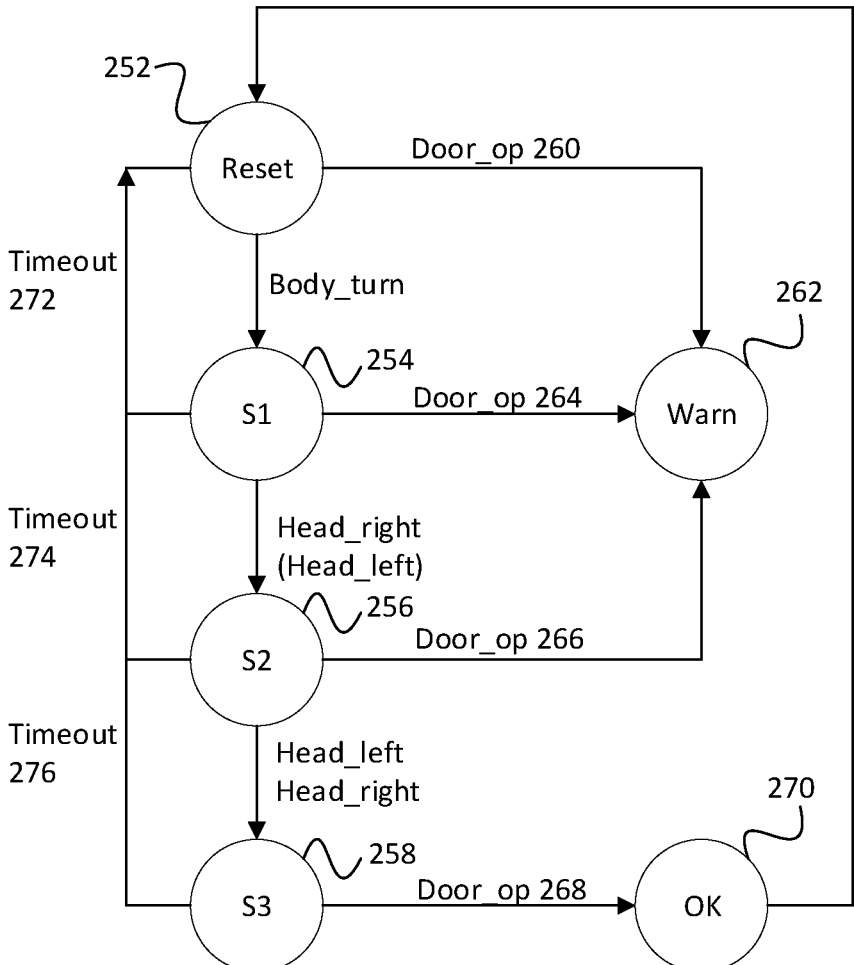
FIG. 2B depicts a state machine implementation of the safety device's functionality.

FIG. 2B depicts a state machine implementation of the safety device's functionality. In this figure, the safety device begins at a reset position 252 and determines from sensor data whether the vehicle occupant's body has turned toward a door 254. If the body has turned toward the door, the safety device proceeds to determine from the sensor data whether the vehicle occupant's head is turned to the right 256. If the safety device determines that the vehicle occupant's head has been turned to the right at step 256, the safety device determines whether the vehicle occupant has turned the occupant's head to the right 258. Note that steps 256 and 258 imply an order of first determining a head being turned to the right and subsequently determining a head being turned to the left. This order is only for ease of description and is not intended to be limiting. The device may alternatively be configured to first detect whether the occupant's head has been turned to the left at step 256 and subsequently to the right at step 258. In a further alternative configuration, the safety device may determine whether the vehicle occupant's head has been turned to either direction (e.g. left or right) at step 256 and the opposite direction at step 258.

If the safety device detects a vehicle occupant operating a door release before determining that the vehicle occupant has turned the vehicle occupant's body at step 254 the safety device performs procedure 260 which results in the safety device warning the vehicle occupant about the danger of opening the vehicle door (e.g. operating according to the second operational mode) 262. If the safety device detects a vehicle occupant operating a door release after having determined that the vehicle occupant's body is turned (e.g. at step 254), but before detecting that the vehicle occupant's head is turned (e.g. prior to reaching step 256), the safety device performs procedure 264 which results in the safety device warning the vehicle occupant about the danger of opening the vehicle door (e.g. operating according to the second operational mode) 262. If the safety device detects a vehicle occupant operating a door release after having determined that the vehicle occupant's body is turned (e.g. at step 254), and after having detected that the vehicle occupant's head is turned (e.g. at step 256), but before determining that the vehicle occupant's head is turned in the opposite direction (e.g. before step 258), the safety device performs procedure 266 which results in the safety device warning the vehicle occupant about the danger of opening the vehicle door (e.g. operating according to the second operational mode) 262. If the safety device detects a vehicle occupant operating a door release after having determined that the vehicle occupant's body is turned (254, head is turned a first direction 256, and the head is turned the second direction 258, then the safety device performs procedure 268, which results in the safety device permitting unencumbered operation of the door release (e.g. operating according to the first operational mode) 270.

In between each state (e.g. between state 252 and state 254, between state 254 and 256, and between state 256 and 258) the safety device may implement an optional timer. This timer may correspond to a period of time before the safety device resets to state 252. That is, after detecting the occupant's body being turned at step 254, a period of time may elapse, after which the system may reset and must again detect the occupant's body being turned. This feature addresses the fact that any step or steps of the Dutch Reach may ensure safety of an oncoming road participant or obstacle at the time the steps are performed and shortly thereafter. In this manner, the safety device may require a repeated performance of the Dutch Reach procedures after a timer has elapsed. This timer is depicted in steps 272, 274, and 276. The timer may be selected to represent a duration of time corresponding to an average bicycle speed and a distance of visibility. For example, if a vehicle occupant can see 10 meters in front of and behind the vehicle, and an average bicycle speed is 15 km/h, a previously undetected cyclist could be at or just before the vehicle's door in only approximately 2.4 seconds. As such, a much shorter timer duration (e.g. 0.2 seconds, 0.5 seconds, or 1 second) may be a suitable timing duration. The timer duration may be a fixed duration, such as based on an average visibility from a given vehicle (e.g. based on physical geometric configurations of the vehicle), or the timer may be dynamic, such as based on actual visibility. In this manner, the safety device may be further configured to receive sensor data from an external area of the vehicle to estimate a visibility of an occupant, and to select the timer accordingly. One possible, suitable formula for determining the timing may be as follows:

$$timing = \frac{d_v}{v_a} * b \tag{1}$$

wherein $d_v$ is a distance in front of and behind the vehicle that is visible from an interior of the vehicle; $v_a$ is an average velocity of a bicycle (e.g. 4.17 meters/second), and b is a buffer factor (e.g. 0.2, 0.5, etc.) which is selected to shorten the time such that a previously undetected cyclist cannot travel the entire visible distance before the safety device resets.

Figure 3:
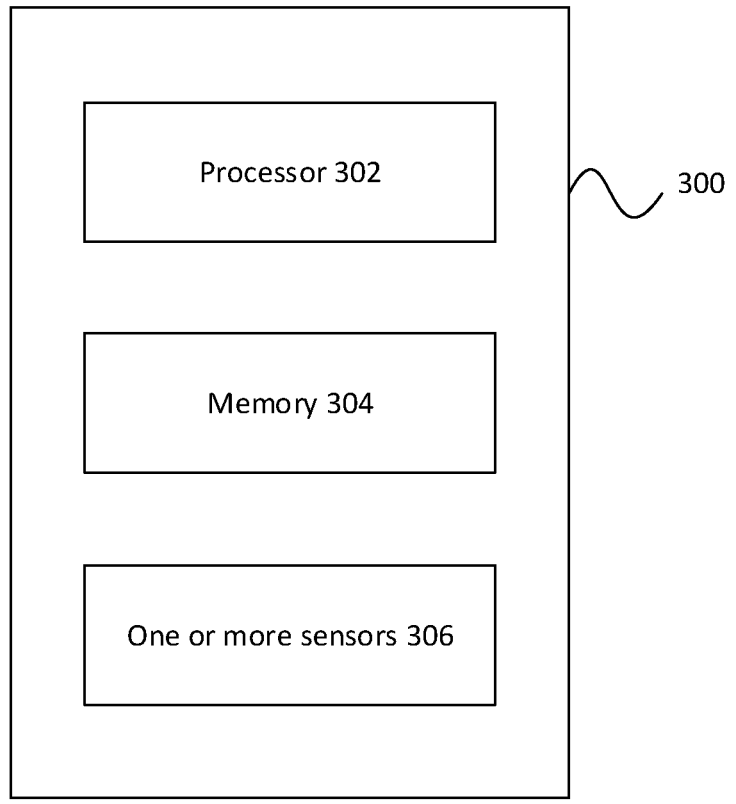
FIG. 3 depicts a safety device according to an aspect of the disclosure.

FIG. 3 depicts safety device 300, including a processor 302, configured to detect from sensor data representing a vehicle occupant, whether the vehicle occupant looks for an oncoming road participant or obstacle. The processor may operate according to a first operational mode when the processor detects that the vehicle occupant looks for an oncoming road participant or obstacle. The processors may operate according to a second operational mode when the processor detects that the vehicle occupant does not look for an oncoming road participant or obstacle. The safety device may further include a memory 304, configured to store data representing the detection that the occupant looked for an oncoming road participant or obstacle. Detecting whether the vehicle occupant looks for an oncoming road participant or obstacle may optionally include the processor detecting from sensor data whether the vehicle occupant turns the vehicle occupant's torso toward a door corresponding to the interior door release. Detecting whether the vehicle occupant looks for an oncoming road participant or obstacle may optionally include the processor detecting whether the vehicle occupant directs the vehicle occupant's gaze in a first direction, and subsequently in a second direction, while the vehicle occupant's torso is turned toward the door. Detecting whether the vehicle occupant directs the vehicle occupant's gaze in the first direction, and subsequently in the second direction may include detecting whether the vehicle occupant directs the vehicle occupant's gaze through a window of the door toward the front of the vehicle and the rear of the vehicle, through a window of the door toward the rear of the vehicle and the front of the vehicle.

FIG. 4 depicts a method of detecting a safety operation, including detecting from sensor data representing a vehicle occupant, whether the vehicle occupant looks for an oncoming road participant or obstacle 402; operating according to a first operational mode when the processor detects that the vehicle occupant looks for an oncoming road participant or obstacle 404; and according to a second operational mode when the processor detects that the vehicle occupant does not look for an oncoming road participant or obstacle 406. The method may optionally include storing data representing the detection that the occupant looked for the oncoming road participant or obstacle in a memory. In this method, detecting whether the vehicle occupant looks for an oncoming road participant or obstacle may include detecting from sensor data whether the vehicle occupant turns the vehicle occupant's torso toward a door corresponding to the interior door release. Detecting whether the vehicle occupant looks for an oncoming road participant or obstacle may include detecting whether the vehicle occupant looks for an oncoming road participant or obstacle includes the processor detecting whether the vehicle occupant directs the vehicle occupant's gaze in a first direction, and subsequently in a second direction, while the vehicle occupant's torso is turned toward the door.

In the first operational mode, the door release is permitted to operate (e.g. to open the door) in an unencumbered fashion. The word unencumbered is used here to distinguish from the second operational mode, in which activating the door release may still result in the door opening, but will be accompanied by one or more warnings and/or by a delayed opening of the door. In some configurations, the second operational mode may include the processor sending a signal to prevent the door from opening, In a first configuration, the default is for no warning (e.g. audible alarm, visual alarm, haptic alarm) and no delay in the opening of the door. In this first configuration, the processor may send a confirmatory signal for operating according to the first operational mode. Alternatively, the processor may send no signal for operating according to the first operational mode, as the default corresponds to operation according to the first operational mode. For operational according to the second operational mode the processor sends a signal to operate according to the second operational mode by activating one or more warnings and/or a delay and/or preventing the occupant in opening the door.

In a second configuration, the default is for one or more warnings and/or a delay to occur upon attempt to operate the door larch. In this second configuration, the processor sends a signal to operate according to the first operational mode by deactivating the warning and/or deactivating the delay in opening the door. In this second configuration, the processor may send a confirmatory signal to operate according to the second operational mode (as the default corresponds to operation according to the second operational mode), or may send no signal to operate according to the second operational mode.

As disclosed herein, the one or more processors may optionally be configured to utilize one or more CV applications to detect the presence, pose, position, movement, or otherwise of a vehicle occupant. Such CV applications may employ any known CV technique or techniques to identify the presence and movements of a vehicle occupant, as described herein. Such techniques may include, but are not limited to, content-based image retrieval, pose estimation, facial recognition, shape recognition, tracking, optical flow, or any of these. The one or more computer vision applications may be configured to acquire images of one or more vehicle occupants, such as by receiving and processing data from the one or more image sensors. The one or more computer vision applications may be configured to preprocess any of the received data, such as to enhance contrast, reduce noise, fix a scale, and/or implement an image coordinate system. The one or more computer vision applications may be configured to extract features which may be associated with a vehicle occupant and detect the presence, position, pose, movement, or any of these of one or more vehicle occupants.

The one or more processors may optionally be configured to utilize one or more AI applications to detect the presence, pose, position, movement, or otherwise of a vehicle occupant. These AI applications may include an artificial neural network, which may include an input layer, one or more hidden layers, and an output layer. The artificial neural network may be configured to perform supervised learning or unsupervised learning. The artificial neural network may optionally be or include one or more convolutional neural networks.

The safety device may include an optional memory, onto which the processor stores data representing the detection that the occupant looked for an oncoming road participant or obstacle. Otherwise stated, because the relevant movements by the occupant may occur at different times (e.g. first turning the body, then turning the head in a first direction, and subsequently turning the head in the third direction), the safety device may store on a memory information about which of the movements have been detected. The processor may be configured to read this information from the memory in determining whether to operate according to the first operational mode or the second operational mode.

The cyclist safety procedure as used herein describes a form of the Dutch Reach maneuver. In the cyclist safety procedure, the occupant turns the occupant's body toward the door to be opened. The occupant may further turn the occupant's head both left and right, so as to view oncoming road participants or obstacles. This may be described herein as the occupant looking for an oncoming road participant or obstacle. Although the Dutch Reach procedure is typically understood as occurring based on the occupant reaching with a hand opposite the door, this may be difficult to detect with existing in-vehicle image sensors, as most image sensors directed at an interior of the vehicle are designed to capture images of the occupant's face or upper body. Such existing cameras may not capture an occupant's hands and thus would be poorly suited to detect a Dutch Reach using a hand position. The cyclist safety procedure as disclosed herein approximates the movements of a Dutch Reach while placing attention on movements of the occupant's upper body, which are more readily seen by existing image sensors.

Notwithstanding the foregoing, some vehicles include image sensors directed to an interior of the vehicle such that they would be able to detect a cross-reaching maneuver consistent with the Dutch Reach. Furthermore, such image sensors may be efficiently installed/installable in vehicles. Where such sensor data is available, including a determination of a cross-reaching maneuver consistent with the Dutch Reach as part of the cyclist safety procedure is intended to be an optional configuration in accordance with this disclosure.

In an optional configuration, operating according to the second operational mode includes either the processor sending a signal to delay opening of a door for a duration after the vehicle occupant initiates the interior door release, or the default setting being a delayed opening, and the processor sends no signal to permit the door to be opened without the delay. The delay may be any length of time. The delay is instituted to alert the occupant to a need for heightened caution while still allowing the occupant to exist the vehicle. The delay may be, for example, a fraction of a second, a second, or a few (e.g. 2-3) seconds.

Operating according to the second operational mode may optionally include the use of any of an audible alarm, a visual alarm, or a haptic alarm. The audible alarm may, for example, be or include an audible sound, such as a ding, beep, siren, or other noise associated with a need for increased attention. A visual alarm may, for example, be or include the turning on of one or more lights, such as an illumination of a vehicle door, turning on the vehicle's interior lights, shining a light on the driver, initiating a flash, or otherwise. A haptic alarm, for example, may be or include a vibration of the door handle or door.

In a further optional configuration, the sensor data of the interior of the vehicle may be first sensor data; and the safety device may include second sensor data representing a vicinity external to the vehicle. In this configuration, the safety device may be configured to detect from the second sensor data whether an object (e.g. a cyclist) is approaching the vehicle. The safety device may then be configured to operate according to the first operational mode when the processor detects that the vehicle occupant looks for an oncoming road participant or obstacle and that no object is approaching the vehicle: The safety device may be configured to operate according to the second operational mode when the processor detects either of the vehicle occupant does not look for an oncoming road participant or obstacle or the processor detected an object approaching the vehicle. The use of external sensor data may represent a possibility to augment the protections of the safety device procedures using sensor data of the vehicle occupant.

Because the evaluation of sensor data may require significant computational resources, it may be desirable in some circumstances to stop or temporarily halt the safety device procedures disclosed herein. In this manner, the processor may be optionally further configured to determine from the sensor data whether any persons are inside the vehicle, and if the processor detects that no persons are inside the vehicle, the processor may be further configured to enter a standby mode or a sleep mode, or to send an instruction or one or more devices to enter a standby mode or a sleep mode.

Although may aspects of this disclosure are drafted with respect to a singular occupant, the safety device may operate with respect to multiple occupants. In this manner, the safety device may be configured to obtain sensor data representing detected images of a plurality of occupants and to determine whether any of these occupants looks for an oncoming road participant or obstacle.

Further aspects of the disclosure will be made by way of example.

In Example 1, a safety device, including a processor, configured to detect from sensor data representing a vehicle occupant, whether the vehicle occupant looks for an oncoming road participant or obstacle; operate according to a first operational mode when the processor detects that the vehicle occupant looks for an oncoming road participant or obstacle; and operate according to a second operational mode when the processor detects that the vehicle occupant does not look for an oncoming road participant or obstacle.

In Example 2, the safety device of Example 1, further including a memory, configured to store data representing the detection that the occupant does not look for an oncoming road participant or obstacle.

In Example 3, the safety device of Example 1 or 2, wherein detecting whether the vehicle occupant looks for an oncoming road participant or obstacle includes the processor detecting from sensor data whether the vehicle occupant turns the vehicle occupant's torso toward a door corresponding to the interior door release.

In Example 4, the safety device of Example 3, wherein detecting whether the vehicle occupant looks for an oncoming road participant or obstacle includes the processor detecting whether the vehicle occupant directs the vehicle occupant's gaze in a first direction, and subsequently in a second direction, while the vehicle occupant's torso is turned toward the door.

In Example 5, wherein detecting whether the vehicle occupant directs the vehicle occupant's gaze in the first direction, and subsequently in the second direction includes detecting whether the vehicle occupant directs the vehicle occupant's gaze through a window of the door toward the front of the vehicle and the rear of the vehicle, through a window of the door toward the rear of the vehicle and the front of the vehicle.

In Example 6, wherein the detecting whether the vehicle occupant looks for an oncoming road participant or obstacle includes the detecting whether the vehicle occupant performs a cross-reach maneuver; wherein the cross-reach maneuver includes the vehicle occupant operating the interior door release with an arm on an opposite side of the vehicle occupant's body from the interior door release.

In Example 7, the safety device of any one of Examples 1 to 6, wherein operating according to the first operational mode includes the processor sending a signal to enable the interior door release.

In Example 8, the safety device of any one of Examples 1 to 7, wherein operating according to the second operational mode includes the processor sending a signal to disable the interior door release.

In Example 9, the safety device of any one of Examples 1 to 8, wherein operating according to the second operational mode includes the processor sending a signal to delay opening of a door for a duration after the vehicle occupant initiates the interior door release.

In Example 10, the safety device of any one of Examples 1 to 9, wherein operating according to the second operational mode includes the processor sending a signal to initiate any of an audible alarm, a visual alarm, or a haptic alarm.

In Example 11, the safety device of Example 10, wherein the processor initiating the visual alarm includes the processor sending a signal to cause an overhead light to flash or a door illumination light to flash.

In Example 12, the safety device of any one of Examples 1 to 11, wherein the processor is further configured to detect whether the vehicle occupant is operating an interior door release; operate according to the first operational mode when the processor detects that the vehicle occupant performed the cyclist safety procedure and the vehicle occupant is operating the interior door release; and operate according to the second operational mode when the processor detects that the vehicle occupant performed no cyclist safety procedure.

In Example 13, the safety device of Example 12, wherein the processor is configured to detect whether the vehicle occupant is operating the interior door release from the sensor data.

In Example 14, the safety device of Example 12, wherein the processor is configured to detect whether the vehicle occupant is operating the interior door release from interior door release sensor data.

In Example 15, the safety device of any one of Examples 1 to 14, wherein the sensor data is first sensor data; further including second sensor data representing a vicinity external to the vehicle, wherein the processor is further configured to detect from the second sensor data whether an object is approaching the vehicle; and wherein the processor is configured to operate according to the first operational mode when the processor detects that the vehicle occupant performed the cyclist safety procedure and that the object is approaching the vehicle; and wherein the processor is configured to operate according to the second operational mode when the processor detects either of the vehicle occupant performed no cyclist safety procedure or the processor detected no object approaching the vehicle.

In Example 16, the safety device of any one of Examples 1 to 15, wherein the processor is further configured to determine from the sensor data whether any persons are inside the vehicle, and if the processor detects that no persons are inside the vehicle, the processor is further configured to send an instruction to enter a standby mode or a sleep mode.

In Example 17, the safety device of any one of Examples 1 to 16, wherein the processor is further configured to detect a duration since the vehicle occupant looked for an oncoming road participant or obstacle, and wherein the processor is configured to operate according to the first operational mode when the duration is within a predetermined range and the vehicle occupant is operating the interior door release; and wherein the processor is configured to operate according to the second operational mode when the duration is outside of a predetermined range.

In Example 18, the safety device of any one of Examples 1 to 17, wherein the sensor data are camera data.

In Example 19, the safety device of any one of Examples 1 to 18, wherein the sensor data are radar data.

In Example 20, the safety device of any one of Examples 1 to 19, wherein the sensor data represents a plurality of vehicle occupants and the one or more processors are further configured to: detect whether any of the plurality of vehicle occupants performed a cyclist safety procedure; for a vehicle occupant of the plurality of vehicle occupants who engage a door release, operate according to a first operational mode when the processor detects that the vehicle occupant performed the cyclist safety procedure; and operate according to a second operational mode when the processor detects that the vehicle occupant performed no cyclist safety procedure.

In Example 21, a method of detecting a safety operation, including: detecting from sensor data representing a vehicle occupant, whether the vehicle occupant performed a cyclist safety procedure; operating according to a first operational mode when the processor detects that the vehicle occupant looks for an oncoming road participant or obstacle; and operating according to a second operational mode when the processor detects that the vehicle occupant does not look for an oncoming road participant or obstacle.

In Example 22, the method of detecting a safety operation of Example 21, further including storing data representing the detection that the occupant looked for an oncoming road participant or obstacle.

In Example 23, the method of detecting a safety operation of Example 21 or 22, wherein the processor detecting that the vehicle occupant looks for an oncoming road participant or obstacle includes the processor detecting that the vehicle occupant turns the vehicle occupant's torso toward a door corresponding to the interior door release.

In Example 24, the method of detecting a safety operation of Example 23, wherein detecting whether the vehicle occupant looks for an oncoming road participant or obstacle includes the detecting whether the vehicle occupant directs the vehicle occupant's gaze in a first direction, and subsequently in a second direction, while the vehicle occupant's torso is turned toward the door.

In Example 25, the method of detecting a safety operation of Example 24, wherein detecting whether the vehicle occupant directs the vehicle occupant's gaze in the first direction, and subsequently in the second direction includes detecting whether the vehicle occupant directs the vehicle occupant's gaze through a window of the door toward the front of the vehicle and the rear of the vehicle, through a window of the door toward the rear of the vehicle and the front of the vehicle.

In Example 26, the method of detecting a safety operation of any one of Examples 21 to 25, wherein detecting whether the vehicle occupant looks for an oncoming road participant or obstacle includes detecting whether the vehicle occupant performing a cross-reach maneuver; wherein the cross-reach maneuver includes the vehicle occupant operating the interior door release with an arm on an opposite side of the vehicle occupant's body from the interior door release.

In Example 27, the method of detecting a safety operation of any one of Examples 21 to 26, wherein operating according to the first operational mode includes enabling the interior door release.

In Example 28, the method of detecting a safety operation of any one of Examples 21 to 27, wherein operating according to the second operational mode includes disabling the interior door release.

In Example 29, the method of detecting a safety operation of any one of Examples 21 to 28, wherein operating according to the second operational mode includes delaying opening of a door for a duration after the vehicle occupant initiates the interior door release.

In Example 30, the method of detecting a safety operation of any one of Examples 21 to 29, wherein operating according to the second operational mode includes initiating any of an audible alarm, a visual alarm, or a haptic alarm.

In Example 31, the method of detecting a safety operation Example 30, wherein initiating the visual alarm includes causing an overhead light to flash or a door illumination light to flash.

In Example 32, the method of detecting a safety operation of any one of Examples 21 to 31, further including detecting whether the vehicle occupant is operating an interior door release; operating according to the first operational mode when the vehicle occupant performing the cyclist safety procedure and the operating the interior door release is detected; and operating according to the second operational mode when the vehicle occupant performing no cyclist safety procedure is detected.

In Example 33, the method of detecting a safety operation of Example 32, further including detecting whether the vehicle occupant is operating the interior door release from the sensor data.

In Example 34, the method of detecting a safety operation of Example 32, further including detecting whether the vehicle occupant is operating the interior door release from interior door release sensor data.

In Example 35, the method of detecting a safety operation of any one of Examples 21 to 34, wherein the sensor data is first sensor data; further including second sensor data representing a vicinity external to the vehicle; wherein the method further includes detecting from the second sensor data whether an object is approaching the vehicle; operating according to the first operational mode when the vehicle occupant looking for an oncoming road participant or obstacle is detected and/or no object is approaching the vehicle; and operating according to the second operational mode when either of the vehicle occupant performing no cyclist safety procedure or the an object approaching the vehicle is detected.

In Example 36, the method of detecting a safety operation of any one of Examples 21 to 35, further including determining from the sensor data whether any persons are inside the vehicle, and if no persons are detected inside the vehicle, sending an instruction to enter a standby mode or a sleep mode.

In Example 37, the method of detecting a safety operation of any one of Examples 21 to 36, further including detecting a duration since the vehicle occupant looked for an oncoming road participant or obstacle; operating according to the first operational mode when the duration is within a predetermined range and the vehicle occupant is operating the interior door release; and operating according to the second operational mode when the duration is outside of a predetermined range.

In Example 38, the method of detecting a safety operation of any one of Examples 21 to 37, wherein the sensor data are camera data.

In Example 39, the method of detecting a safety operation of any one of Examples 21 to 38, wherein the sensor data are radar data.

In Example 40, the method of detecting a safety operation of any one of Examples 21 to 39, wherein the sensor data represents a plurality of vehicle occupants; further including detecting whether any of the plurality of vehicle occupants performed a cyclist safety procedure; for a vehicle occupant of the plurality of vehicle occupants who engage a door release, operate according to the first operational mode when the vehicle occupant performing the cyclist safety procedure is detected; and operating according to the second operational mode when the vehicle occupant performing no cyclist safety procedure is detected. In Example 41, a non-transitory computer readable medium, including instructions which, if executed, cause one or more processors to detect from sensor data representing a vehicle occupant, whether the vehicle occupant looks for an oncoming road participant or obstacle; operate according to a first operational mode when the processor detects that the vehicle occupant looks for an oncoming road participant or obstacle; and operate according to a second operational mode when the processor detects that the vehicle occupant does not look for an oncoming road participant or obstacle.

In Example 42, the non-transitory computer readable medium of Example 41, further including a memory, configured to store data representing the detection that the occupant performed the cyclist safety procedure.

In Example 43, the non-transitory computer readable medium of Example 41 or 42, wherein the instructions being configured to cause one or more processors to detect whether the vehicle occupant looks for an oncoming road participant or obstacle includes the instructions being configured to cause the one or more processors to detect whether a vehicle occupant turns the vehicle occupant's torso toward a door corresponding to the interior door release.

In Example 44, wherein the instructions being configured to cause one or more processors to detect whether the vehicle occupant looks for an oncoming road participant or obstacle includes the instructions being configured to cause one or more processors to detect whether the vehicle occupant directs the vehicle occupant's gaze in a first direction, and subsequently in a second direction, while the vehicle occupant's torso is turned toward the door.

In Example 45, the non-transitory computer readable medium of Example 44, wherein detecting whether the vehicle occupant directs the vehicle occupant's gaze in the first direction, and subsequently in the second direction includes detecting whether the vehicle occupant directs the vehicle occupant's gaze through a window of the door toward the front of the vehicle and the rear of the vehicle, through a window of the door toward the rear of the vehicle and the front of the vehicle.

In Example 46, the non-transitory computer readable medium of any one of Examples 41 to 45, wherein determining whether the vehicle occupant looks for an oncoming road participant or obstacle includes detecting whether the vehicle occupant performs a cross-reach maneuver; wherein the cross-reach maneuver includes the vehicle occupant operating the interior door release with an arm on an opposite side of the vehicle occupant's body from the interior door release.

In Example 47, the non-transitory computer readable medium of any one of Examples 41 to 46, wherein operating according to the first operational mode includes the processor sending a signal to enable the interior door release.

In Example 48, the non-transitory computer readable medium of any one of Examples 41 to 47, wherein operating according to the second operational mode includes the processor sending a signal to disable the interior door release.

In Example 49, the non-transitory computer readable medium of any one of Examples 41 to 48, wherein operating according to the second operational mode includes the processor sending a signal to delay opening of a door for a duration after the vehicle occupant initiates the interior door release.

In Example 50, the non-transitory computer readable medium of any one of Examples 41 to 49, wherein operating according to the second operational mode includes the processor sending a signal to initiate any of an audible alarm, a visual alarm, or a haptic alarm.

In Example 51, the non-transitory computer readable medium of Example 50, wherein the processor initiating the visual alarm includes the processor sending a signal to cause an overhead light to flash or a door illumination light to flash.

In Example 52, the non-transitory computer readable medium of any one of Examples 41 to 51, wherein the processor is further configured to detect whether the vehicle occupant is operating an interior door release; operate according to the first operational mode when the processor detects that the vehicle occupant looks for an oncoming road participant or obstacle and the vehicle occupant is operating the interior door release; and operate according to the second operational mode when the processor detects that the vehicle occupant does not look for an oncoming road participant or obstacle.

In Example 53, the non-transitory computer readable medium of Example 52, wherein the processor is configured to detect whether the vehicle occupant is operating the interior door release from the sensor data.

In Example 54, the non-transitory computer readable medium of Example 52, wherein the processor is configured to detect whether the vehicle occupant is operating the interior door release from interior door release sensor data.

In Example 55, the non-transitory computer readable medium of any one of Examples 41 to 54, wherein the sensor data is first sensor data; further including second sensor data representing a vicinity external to the vehicle, wherein the processor is further configured to detect from the second sensor data whether an object is approaching the vehicle; and wherein the processor is configured to operate according to the first operational mode when the processor detects that the vehicle occupant looks for an oncoming road participant or obstacle and that no object is approaching the vehicle; and wherein the processor is configured to operate according to the second operational mode when the processor detects either of the vehicle occupant performed no cyclist safety procedure or the processor detects an object approaching the vehicle.

In Example 56, the non-transitory computer readable medium of any one of Examples 41 to 55, wherein the processor is further configured to determine from the sensor data whether any persons are inside the vehicle, and if the processor detects that no persons are inside the vehicle, the processor is further configured to send an instruction to enter a standby mode or a sleep mode.

In Example 57, the non-transitory computer readable medium of any one of Examples 41 to 56, wherein the processor is further configured to detect a duration since the vehicle occupant looked for an oncoming road participant or obstacle, and wherein the processor is configured to operate according to the first operational mode when the duration is within a predetermined range and the vehicle occupant is operating the interior door release; and wherein the processor is configured to operate according to the second operational mode when the duration is outside of a predetermined range.

In Example 58, the non-transitory computer readable medium of any one of Examples 41 to 57, wherein the sensor data are camera data.

In Example 59, the non-transitory computer readable medium of any one of Examples 41 to 58, wherein the sensor data are radar data.

In Example 60, the non-transitory computer readable medium of any one of Examples 41 to 59, wherein the sensor data represents a plurality of vehicle occupants and the one or more processors are further configured to: detect whether any of the plurality of vehicle occupants looked for an oncoming road participant or obstacle; for a vehicle occupant of the plurality of vehicle occupants who engage a door release, operate according to a first operational mode when the processor detects that the vehicle occupant looks for an oncoming road participant or obstacle; and operate according to a second operational mode when the processor detects that the vehicle occupant did not look for an oncoming road participant or obstacle.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. A safety device, comprising:
a processor, configured to:
detect from sensor data representing a vehicle occupant, whether the vehicle occupant looks for an oncoming road participant or obstacle;
operate according to a first operational mode when the processor detects that the vehicle occupant looks for an oncoming road participant or obstacle; and
operate according to a second operational mode when the processor detects that the vehicle occupant does not look for an oncoming road participant or obstacle; and
wherein detecting whether the vehicle occupant looks for an oncoming road participant or obstacle comprises the processor detecting from sensor data whether the vehicle occupant turns the vehicle occupant's torso toward a door corresponding to an interior door release.

2. The safety device of claim 1, further comprising a memory, configured to store data representing the detection that the occupant looked for an oncoming road participant or obstacle.

3. The safety device of claim 1, wherein detecting whether the vehicle occupant looks for an oncoming road participant or obstacle comprises the processor detecting whether the vehicle occupant directs the vehicle occupant's gaze in a first direction, and subsequently in a second direction, while the vehicle occupant's torso is turned toward the door.

4. The safety device of claim 3, wherein detecting whether the vehicle occupant directs the vehicle occupant's gaze in the first direction, and subsequently in the second direction comprises detecting whether the vehicle occupant directs the vehicle occupant's gaze through a window of the door toward the front of the vehicle and the rear of the vehicle, or through a window of the door toward the rear of the vehicle and the front of the vehicle.

5. The safety device of claim 1, wherein the detecting whether the vehicle occupant looks for an oncoming road participant or obstacle comprises the detecting whether the vehicle occupant performs a cross-reach maneuver;
wherein the cross-reach maneuver comprises the vehicle occupant operating the interior door release with an arm on an opposite side of the vehicle occupant's body from the interior door release.

6. The safety device of claim 1, wherein operating according to the first operational mode comprises the processor sending a signal to enable the interior door release.

7. The safety device of claim 1, wherein operating according to the second operational mode comprises the processor sending a signal to disable the interior door release.

8. The safety device of claim 1, wherein operating according to the second operational mode comprises the processor sending a signal to delay opening of the door for a duration after the vehicle occupant initiates the interior door release.

9. The safety device of claim 1, wherein operating according to the second operational mode comprises the processor sending a signal to prevent the door from opening.

10. The safety device of claim 1, wherein operating according to the second operational mode comprises the processor sending a signal to initiate any of an audible alarm, a visual alarm, or a haptic alarm.

11. The safety device of claim 10, wherein the processor initiating the visual alarm comprises the processor sending a signal to cause an overhead light to flash or a door illumination light to flash.

12. The safety device of claim 1, wherein the processor is further configured to detect whether the vehicle occupant is operating the interior door release; operate according to the first operational mode when the processor detects that the vehicle occupant looks for an oncoming road participant or obstacle and detects that the vehicle occupant is operating the interior door release; and operate according to the second operational mode when the processor detects that the vehicle occupant does not look for an oncoming road participant or obstacle.

13. The safety device of claim 1, wherein the sensor data is first sensor data;
further comprising second sensor data representing a vicinity external to the vehicle, wherein the processor is further configured to detect from the second sensor data whether an object is approaching the vehicle; and
wherein the processor is configured to operate according to the first operational mode when the processor detects that the vehicle occupant looks for an oncoming road participant or obstacle and that no object is approaching the vehicle; and
wherein the processor is configured to operate according to the second operational mode when the processor detects either of the vehicle occupant does not look for an oncoming road participant or obstacle or the processor detects an object approaching the vehicle.

14. The safety device of claim 1, wherein the processor is further configured to determine from the sensor data whether any persons are inside the vehicle, and if the processor detects that no persons are inside the vehicle, the processor is further configured to send an instruction to enter a standby mode or a sleep mode.

15. A non-transitory computer readable medium, comprising instructions which, if executed, cause one or more processors to:

detect from sensor data representing a vehicle occupant, whether the vehicle occupant looks for an oncoming road participant or obstacle;

operate according to a first operational mode when the processor detects that the vehicle occupant looks for an oncoming road participant or obstacle; and operate according to a second operational mode when the processor detects that the vehicle occupant does not look for an oncoming road participant or obstacle; and wherein the instructions being configured to cause one or more processors to detect whether the vehicle occupant looks for an oncoming road participant or obstacle comprises the instructions being configured to cause the one or more processors to detect whether a vehicle occupant turns the vehicle occupant's torso toward a door corresponding to an interior door release.

16. The non-transitory computer readable medium of claim 15, wherein the instructions being configured to cause one or more processors to detect whether the vehicle occupant looks for an oncoming road participant or obstacle comprises the instructions being configured to cause one or more processors to detect whether the vehicle occupant directs the vehicle occupant's gaze in a first direction, and subsequently in a second direction, while the vehicle occupant's torso is turned toward the door.

17. A safety device, comprising:

a processor, configured to:

detect from sensor data representing a vehicle occupant, whether the vehicle occupant looks for an oncoming road participant or obstacle;

operate according to a first operational mode when the processor detects that the vehicle occupant looks for an oncoming road participant or obstacle; and operate according to a second operational mode when the processor detects that the vehicle occupant does not look for an oncoming road participant or obstacle; and wherein the detecting whether the vehicle occupant looks for an oncoming road participant or obstacle comprises the detecting whether the vehicle occupant performs a cross-reach maneuver; wherein the cross-reach maneuver comprises the vehicle occupant operating the interior door release with an arm on an opposite side of the vehicle occupant's body from an interior door release; or wherein the processor is further configured to detect whether the vehicle occupant is operating an interior door release; operate according to the first operational mode when the processor detects that the vehicle occupant looks for an oncoming road participant or obstacle and detects that the vehicle occupant is operating the interior door release; and operate according to the second operational mode when the processor detects that the vehicle occupant does not look for an oncoming road participant or obstacle.

* * * * *